Sept. 29, 1925.  S. KRUSZYNSKI  1,555,675
AUTOMATIC FLOWER WATERER
Original Filed April 18, 1924    2 Sheets-Sheet 1
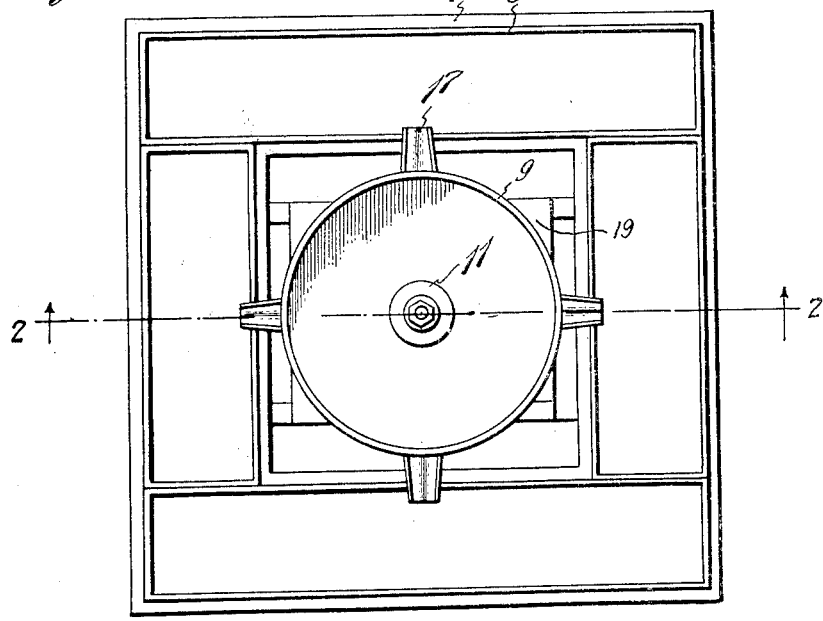
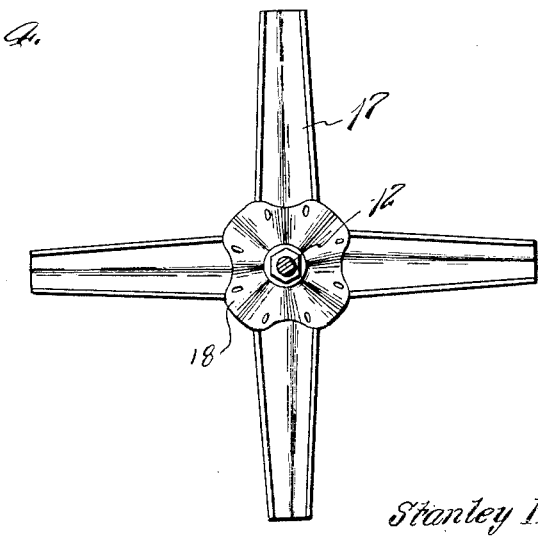
Stanley Kruszynski
INVENTOR
BY Victor J. Evans
ATTORNEY
WITNESS:

Sept. 29, 1925. 1,555,675
S. KRUSZYNSKI
AUTOMATIC FLOWER WATERER
Original Filed April 18, 1924  2 Sheets-Sheet 2

Stanley Kruszynski
INVENTOR
BY Victor J. Evans
ATTORNEY

WITNESS:

Patented Sept. 29, 1925.

1,555,675

UNITED STATES PATENT OFFICE.

STANLEY KRUSZYNSKI, OF PHILADELPHIA, PENNSYLVANIA.

AUTOMATIC FLOWER WATERER.

Application filed April 18, 1924, Serial No. 707,487. Renewed August 5, 1925.

*To all whom it may concern:*

Be it known that I, STANLEY KRUSZYNSKI, a citizen of the Republic of Poland, residing at Philadelphia, in the county of Philadelphia and State of Pennsylvania, have invented new and useful Improvements in Automatic Flower Waterers, of which the following is a specification.

The object of this invention is the provision of means for automatically supplying plants or flowers with moisture.

A further object is the provision of a device for this purpose characterized by simplicity in construction and reliability and efficiency in practical use.

To the attainment of the foregoing, the invention consists in the improvement as hereinafter described and definitely claimed.

In the drawings:

Figure 1 is a top plan view of the improvement.

Figure 4 is a top plan view of the distributing plate and the troughs connected therewith.

Figure 2:
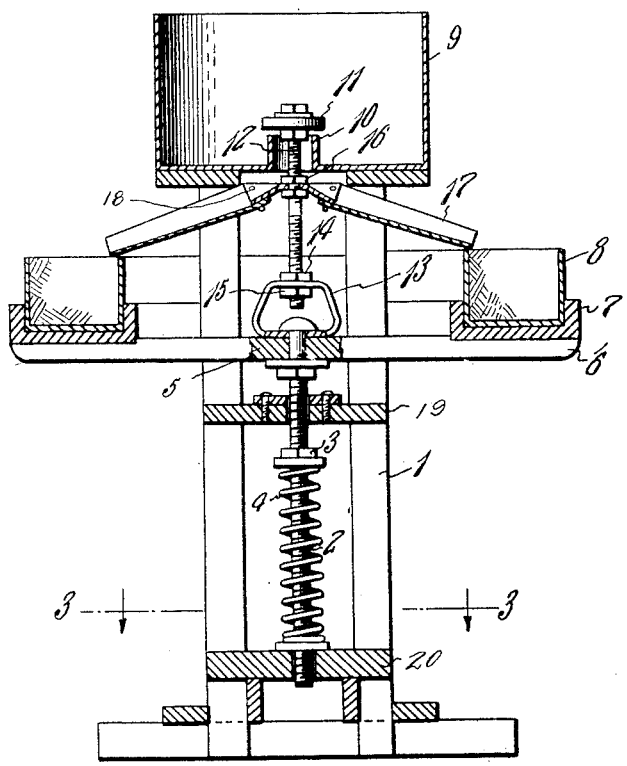
Figure 2 is a sectional view on the line 2—2 of Figure 1.
Figure 3:
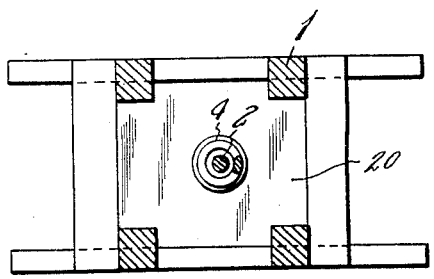
Figure 3 is a sectional view on the line 3—3 of Figure 2.

As disclosed by the drawings I make use of a stand broadly indicated by the numeral 1. The stand may be highly ornamented and has centrally arranged therein and freely guided through suitable bearings a threaded rod 2. The bearings are secured to the uprights of the stand and for distinction the upper bearing is indicated by the numeral 19 and the lower bearing by the numeral 20. As these bearings are of wood, the same have preferably arranged on their upper faces metal disks to reinforce the walls of the opening through which the slidable rod 2 passes. Screwed on the rod there is a nut 3 that engages with a washer which in turn engages with one end of a helical spring 4 that surrounds the rod, the lower end of the spring resting on the base of the stand. The spring has a tendency to move the rod in an upward direction.

Secured on the upper end of the rod there is a head 5. Radiating from the head 5 and passing through the sides of the stand there are arms 6. These arms support thereon a substantially square or rectangular channeled member 7. In the longitudinal and transverse portions of the channeled members there are arranged boxes 8 for growing flowers or plants.

Supported on the stand 1, above the flower boxes 8 there is a receptacle 9 containing water. The bottom of the receptacle is provided with a central opening surrounded by an upstanding annular flange 10. The flange provides a seat for a valve 11. The valve is connected to the head 5 by adjustable means, preferably in the nature of a threaded rod 12 that passes through a yoke 13 on the said rod, nuts 14 and 15 engaging the upper and lower faces of the yoke. In this manner it will be noted that the valve is adjustable with respect to its seat.

On the rod 12 at the bottom of the receptacle 9 there is adjustably secured by a nut 16 the distributing plate 18 leading to downwardly inclined radially disposed troughs 17, one of the troughs being directed over each of the flower containing boxes 8.

The flower boxes, when the soil for the flowers is moistened, are weightier than when the soil is dry. Thus the weight of the moistened soil will move the channeled receptacle 7 downwardly and exerting a pressure on the spring 4 will hold the valve seated. As the moisture evaporates the decreased weight of soil in the flower boxes will permit the spring to move the said flower boxes upwardly, unseating the valve and allowing a quantity of water to flow through the valve seat and through the troughs into the respective flower boxes. In this manner it will be noted that the flowers are automatically watered, and it is believed that the above description, when taken in connection with the drawings, will amply set forth the construction, operation and advantages of my improvement to those skilled in the art to which such inventions relate. It is to be understood, however, that I am not to be limited to the precise structure shown, but hold myself entitled to all such changes therefrom as fairly fall within the scope of what I claim.

Having described the invention, I claim:—

In a device for the purpose set forth, a stand, a spring influenced rod guided therein, means for adjusting the spring of the rod, a head on the rod having lateral arms extending through the stand, a substantially square channeled member on the arms receiving flower boxes therein, a water receptacle having a central opening in the bottom thereof supported on the top of the stand, a valve for closing the opening, means adjustably connecting the valve with the head, a member having radially disposed troughs directed over the respective boxes and adjustably secured on the valve supporting means.

In testimony whereof I affix my signature.

STANLEY KRUSZYNSKI.